United States Patent Office 2,929,559
Patented Mar. 22, 1960

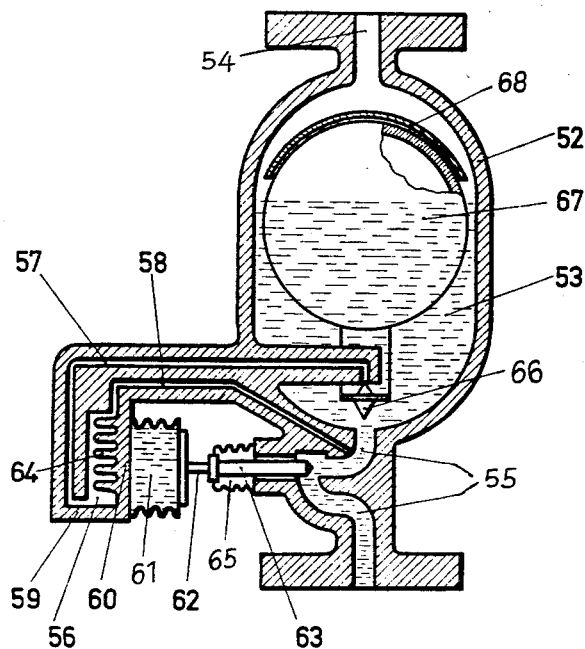

2,929,559

CONDENSATE DISCHARGING DEVICE

Konrad Andersen, Nurnberg, and Helmut Lang, Siegsdorf, Germany, assignors to Medo Apparategesellschaft m.b.H. & Co., Traunstein, Germany, a corporation Application June 19, 1956, Serial No. 592,451

Claims priority, application Germany June 22, 1955

4 Claims. (Cl. 236—55)

The present invention relates to condensate discharging devices of the type in which the action of discharging the condensate is controlled by temperature-sensitive control members.

Condensate discharging devices of known construction comprise a reservoir adapted to collect the condensate as it is formed, and from which the collected condensate is drained as soon as it has reached a predetermined level in said reservoir. The draining means of such devices are controlled either by floats, or, since more recent times, bimetallic elements which are arranged in the interior of the condensate collecting reservoir and which are thus disposed in and subjected to the action of the flow of condensate. Experience has shown that the control means of known design used in condensate discharging devices or steam traps, particularly in small-size devices of this type, will not function properly.

In most cases it is observed that the temperature-sensitive control member, due to the frequently encountered absence of any difference in temperature between the condensate and the steam following the condensate, or due to the presence of only a very small difference in temperatures, or due to the presence of steam vapour in the reservoir, either constantly maintains the drain pipe for the condensate open, so that the condensate is not collected until a predetermined level is reached, thus causing the condensate to be drained away immediately, with the result that steam is allowed to escape in undesirable quantities, or that the temperature-sensitive control member maintains the drain pipe closed for a major period of time, causing the condensate to back up in the condensate inlet pipe, a condition which it is also desired to avoid. In order to control the discharge of the condensate in an optimum manner, it is necessary to adjust the bimetallic element with extreme accuracy. However, since a given adjustment is only true for a set of predetermined operating conditions, it follows that any change in operating conditions will result in the steam trap being controlled in an improper manner.

An ideal condensate discharging device or steam trap should meet the following requirements to the greatest possible extent:

Within a range of operation which is defined by a given minimum pressure and a given maximum pressure for which the steam trap has been designated, it should drain the condensate automatically and with the smallest possible delay, as the retention of condensate is apt to cause undesirable and in some cases extremely troublesome consequences, such as a reduction in heat transfer area in the case of heat exchangers, dangerous water-hammer effects, premature wear of valves and fittings and so forth. Again, in order to prevent trouble of the type indicated, the steam trap should allow any air or gases present therein to escape without any delay. Moreover, an efficient steam trap should operate economically, i.e. it should prevent any loss of steam during its operation, and it should function equally well under all operating conditions; that is, it should be designed completely to drain the condensate as early as when the plant with which it is used is being started up, since it has been known that during starting the rate at which condensate is collected is a multiple of what it is under normal operating conditions.

In regard to the operational safety of a steam trap it is a further requirement that, besides its general performance, its functioning and dependability in operation be independent of conditions prevailing on its output side. The steam trap should also remain fully operative in the event the condensate is backed up on the output side.

In addition to the foregoing it is of great importance that the valving and control means be so designed that even the presence of coarse foreign particles will not render the steam trap completely inoperative. Finally it is an important requirement that the forces available for the actuation of the shut-off or control member of the condensate drain be of great magnitude in relation to the forces actually required for operation, so that proper operation of the shunt-off means is insured.

As regards the economy in use of a condensate trap it is desirable that it have a high performance with the smallest possible dimensions of the device, that a device of a given size be capable of operating over a wide range of pressures and output values, and that it be of a simple construction in order to eliminate trouble as far as possible, so as to reduce or even eliminate maintenance requirements. Furthermore, the steam trap should be capable of being easily installed.

There have already been known steam traps of the type in which the thermally sensitive drive element controlling the discharge is disposed in a condensate shunt passage, but as regards their operative characteristics these devices do not differ in any way from those mentioned earlier.

In order to eliminate the drawbacks just discussed, the present invention proposes a device which comprises a main chamber receiving the condensate and from which the condensate is drained, and an auxiliary chamber adjacent the main chamber of the steam trap, but out of the path of the main stream of condensate, the said auxiliary chamber being in communication with the main chamber and being of a design such that under any given uniform operating conditions the condensate contained in the auxiliary chamber will assume a temperature that is lower than the temperature of the condensate present in the main chamber, the arrangement being such that the draining away of the condensate is controlled in dependence on the difference between the temperatures of the contents of the two chambers or on the temperature of the contents of the auxiliary chamber.

The temperature-sensitive control member is disposed either within the auxiliary chamber or is arranged in conductive relation therewith, the result being that the control member is disposed outside the direct condensate flow through the steam trap and that the constantly inflowing condensate cannot influence the manner in which the drain valve is controlled.

In a steam trap according to the invention, the liquid phase of the condensate is collected in the main chamber and part of it is transferred to the said auxiliary chamber; the steam phase of the condensate which fills the remainder of the space within the main chamber may also be in communication with the upper portion of the space within the auxiliary chamber. The auxiliary chamber is preferably given a shape such that the walls as well as the contents thereof are subject to rapid cooling. For this purpose it is preferred to provide cooling fins on the outside of the housing of the auxiliary chamber; it will, however, be understood that it is also possible to provide for cooling by a liquid or other medium.

Upon the liquid in the auxiliary chamber reaching a level such that neither condensate nor steam can enter it, the contents of the auxiliary chamber, due to the specific design of the latter, will be subject to rapid cooling, this in turn producing a temperature difference between the contents of the main chamber and the contents of the auxiliary chamber. In this case the temperature-sensitive control member mounted within or on the auxiliary chamber will actuate a controlled element which is adapted to open the condensate drain valve, causing the liquid level in the two chambers to be lowered until the steam entering into the auxiliary chamber increases the temperature in the latter, this in turn causing the temperature-sensitive control member to shut off the condensate drain pipe. It will be readily understood that during this action the liquid level in the two chambers will again rise, whereupon the cycle just described will be repeated, and so on.

According to another feature of the invention the said auxiliary chamber may advantageously be disposed at a slight distance from the main chamber, the exterior wall of the auxiliary chamber carrying the thermal drive element controlling the discharge of condensate.

Provided in the main chamber is a supplementary element in the form of an auxiliary float controlling, for example, a two-seat valve controlling the supply of condensate to the auxiliary chamber and the draining of condensate from the main or collecting chamber as a function of the condensate level in the main chamber. These elements will immediately shut off the main condensate discharge path when the condensate level in the main chamber falls to a predetermined lower level. At the same time or a little earlier the supply passage leading to the auxiliary chamber is opened so that hot condensate may be transferred to the auxiliary chamber where part of the heat contained in the condensate is transferred to the thermal drive element, the condensate then leaving the auxiliary chamber. The heat content of the remainder of the condensate entering into the auxiliary chamber will be sufficient to operate the thermal drive element even in the lower portion of the range of operation of the device, provided only that suitable heat transfer conditions between the auxiliary chamber and the drive element are ensured.

Upon the thermal drive element being expanded due to its being heated, in the main shut-off valve will be operated and the condensate drain passage will be closed. Thus the condensate level in the main chamber is allowed to rise as fresh condensate accumulates, and the shut-off element disposed in the main chamber can again open the condensate drain passage, since in the meantime the thermal drive element will have opened the drain passage by operating the shut-off element.

Nor is it necessary that the forces produced by the thermal drive element and the length of travel thereof depend in a closely defined manner on the temperature. It is particularly convenient to use a thermal drive element of a type comprising a bellows filled with a liquid, such as alcohol, having a suitable boiling point that is lower than that of water, so that the forces derived from the drive element may be great in proportion to the forces occurring at the valve, the result being that in such steam traps according to the invention, as distinguished from thermally controlled steam traps of known construction, the functioning of the device is in no way dependent on the pressure differential between the input side and the output side.

According to a further feature of the invention the principles of the invention may also be applied to steam traps comprising a condensate drain passage controlled by a valve member disposed between the condensate pipe and the steam pipe. This embodiment is conveniently designed in such a manner that besides the main chamber which receives the condensate and through which the condensate passes there is provided, outside of the condensate flow path, an auxiliary chamber which is disposed above the bottom of the chamber housing the valve member. The functioning of the device may be further improved by providing the bottom of said valve chamber with ribs or fins extending into the auxiliary chamber and thus increasing the surface of the bottom portion lying between the valve chamber and the auxiliary chamber.

In practice, it has been found that thermodynamic steam traps of the type in which the condensate drain is shut off from the steam line by a disc valve member have certain disadvantages. During its operation the valve member will open the condensate drain passage at relatively short intervals, thus not only discharging the condensate, but also permitting steam to escape, the losses of steam being of considerable and undesirable magnitude.

This undesirable mode of operation of the said steam traps is accounted for by the fact that the steam contained in the space above the valve member is condensed too rapidly, causing the pressure to be reduced too quickly.

This drawback can be eliminated by providing the steam trap with an auxiliary chamber which is in communication with the main chamber or with the pipe line, and the function of which is to prevent excessively rapid cooling of the steam in the valve chamber. It will be readily understood that, as long as steam is allowed to flow into the auxiliary chamber through the communication passage, the partition between the auxiliary chamber and the valve chamber is being heated so that cooling of the steam in the valve chamber is prevented. The condensate will thus first be collected, part of the condensate then being transferred by overflowing into the auxiliary chamber where it prevents the steam from remaining in contact with the partition between the auxiliary and valve chambers, thus allowing the steam contained in the valve chamber to be rapidly cooled and condensed. This in turn causes the valve to open and the collected condensate to drain away. At the same time the auxiliary chamber will be drained of the condensate contained therein. The steam then entering the device will again close the valve and heat the partition in the auxiliary chamber until the newly accumulating condensate enters the auxiliary chamber, covering the partition of the valve chamber and thus preventing the steam from continuing to heat the partition, the same cycle then being repeated.

Other objects, features and advantages of the present invention will be readily apparent from the following detailed description of certain preferred embodiments thereof taken in conjunction with the accompanying drawings, in which:

The figure is a vertical sectional view of an embodiment of a steam trap according to the invention in which there is provided in the condensate collecting chamber a float-and-valve unit controlling the discharge of condensate, and in which the auxiliary chamber housing the thermosensitive drive element controlling the valve in the condensate discharge path is disposed exteriorly of the main chamber and at a certain distance therefrom.

A particularly advantageous embodiment of the steam trap of the invention is shown in the figure, where the steam trap housing 52 comprises a main chamber 53 in which the condensate entering through the pipe 54 is collected and from which the condensate is discharged through the passage 55. Disposed exteriorly of the main chamber 53 is an auxiliary chamber 56 which is in communication with the main chamber 53 via a supply passage 57, and which has a drain passage 58 which terminates in the condensate discharge passage 55 of the main chamber 53, the housing 59 of the auxiliary chamber being attached to the main chamber housing 52. Secured to the outer wall 60 of the auxiliary chamber housing 59 is a thermally energizable drive element 61 which controls the main condensate discharge control valve 63 through a link 62. On the inside of the wall which carries on its outside the thermal drive element 61 there are provided a plurality of fins 64 serving to increase the surface facing the interior of the auxiliary chamber. The main valve 63 is sealed by means of a bellows 65 the use of which dispenses with the provision of packing glands the greater friction of which would tend to require a greater force for the operation of the main valve.

Within the main chamber 53 the entries of the condensate discharge passage 55 and of the passage 57 supplying the auxiliary chamber 56 are arranged opposite one another and they are shown to be controlled by a double-acting valve member 66 supported by a float 67 which controls the valve member 66 in dependence on the liquid level in the main chamber. It is preferred to arrange a baffle 68 in the upper portion of the main chamber 53.

The operation of the invention is as follows:

When the steam trap is put into operation, the entry of the main condensate discharge passage 55 is first closed by the valve member 66. No pressure differential can be initially established between the input side and the output side, since the steam entering the cold system will be condensed immediately. The condensate thus formed will collect in the main chamber, gradually lifting the float 67 with the double-acting valve 66 and opening the main condensate drain passage 55. As soon as the temperature of the system approaches the saturated steam temperature corresponding to the operating pressure, the amount of condensate being collected will become smaller than the amount of condensate discharged, that is to say, the float 67 carrying the double-acting valve 66 will be lowered, uncovering the entry of the passage 57 leading to the auxiliary chamber 56, and closing the main condensate discharge passage 55. The remainder of the condensate entering into the auxiliary chamber 56 will heat up the wall 60 thereof and thus also the thermal drive element 61 which will then come into action to operate the main valve 63 to close the main condensate discharge passage 55 downstream of the valve 66. Thus the double valve 66 and the float 67 will be relieved of load and when condensate is again accumulated in the main chamber they will rise, whereby the passage 57 leading to the auxiliary chamber 56 will again be closed.

As soon as the valve 66 has closed the supply passage 57, the temperature in the auxiliary chamber 56 will drop, as will the temperature of the working medium contained in the thermal drive element 61, causing the main valve 63 to be opened and allowing any additional hot condensate to escape immediately via the drain passage 55. Upon the level of the condensate in the main chamber 53 dropping to a predetermined minimum level, the valve 66 will again close the entry of the condensate discharge passage 55 in the main chamber 53 so that hot condensate can again pass through the passage 57 into the auxiliary chamber 56 where it causes the main valve 63 in the condensate discharge passage 55 to be closed by the mechanism described earlier. Upon a suitable drop in the temperature of the auxiliary chamber 56 and of the thermal drive element 61 the main valve 63 will be re-opened in the manner described. As soon as the float 67 is lifted to a predetermined level by the condensate collecting in the main chamber, the passage 57 supplying the auxiliary chamber 56 will again be closed in order to prevent the transfer of hot condensate into the auxiliary chamber so that the hot condensate contained in the auxiliary chamber may cool down without new heat being added by hot condensate entering said chamber.

In view of the fact that such a steam trap according to the invention combines the advantages of hitherto known float type or thermal type steam traps, without exhibiting any of the drawbacks discussed earlier, a steam trap according to the invention is seen to meet fully the requirements made of an ideal steam trap.

Moreover, the steam traps of the present invention are of simple design and can, therefore, be made conveniently and economically.

The advantages of the steam traps according to the invention reside particularly in the fact that the said steam traps are universally applicable, since their functioning is independent of the pressure differential between the input side and the output side, and since their operation is also independent of the saturated-steam temperature.

It will be understood that modifications and variations may be effected without departing from the spirit and scope of the novel concepts of the present invention.

What we claim, is:

1. In a condensate discharge device, in combination, a housing having a wall defining a condensate collecting main chamber and an auxiliary chamber spaced therefrom, a discharge passage for condensate from said main chamber and said auxiliary chamber, a supply conduit communicating between said main chamber and said auxiliary chamber, a drain passage from said auxiliary chamber terminating at said discharge passage from said main chamber, a double acting valve suspended in the condensate within said main chamber, said supply conduit and discharge passage for condensate from said main chamber each forming a valve seat for said double acting valve and both of said valve seats being upstream from said drain passage from said auxiliary chamber, means movable by the change in the level of said condensate in said main chamber between two extreme positions to close the seat formed by the supply conduit when the condensate level is high at one of said extreme positions and to move said double acting valve to close the seat formed by said discharge passage from said main chamber when the condensate is low at the other of said extreme positions, a control valve disposed in the discharge passage from said main chamber operable to open and close said discharge passage and thermally energizable operating means adjacent said auxiliary chamber and connected to said control valve which is actuatable to operate said control valve in response to the temperature prevailing in said auxiliary chamber whereby said control valve closes when the temperature in said auxiliary chamber rises and said control valve opens when the temperature in said auxiliary chamber falls.

2. In a condensate discharge device as claimed in claim 1 wherein the wall of said auxiliary chamber is provided with cooling fins on the outside thereof.

3. In a condensate discharge device as claimed in claim 1 wherein said operating means comprises a thermal drive element connected to the wall externally of said auxiliary chamber.

4. In a condensate discharge device as claimed in claim 1 wherein said operating means comprises a bellows connected to the wall externally of said auxiliary chamber, said bellows expanding with rising temperature in said auxiliary chamber and contracting as the temperature falls in said auxiliary chamber.

References Cited in the file of this patent

UNITED STATES PATENTS

| 1,583,136 | Srulowitz et al. | May 4, 1926 |
| 1,889,311 | Browne | Nov. 29, 1932 |
| 2,163,667 | Crowther et al. | June 27, 1939 |
| 2,203,110 | Smith | June 4, 1940 |
| 2,749,045 | Pape | June 5, 1956 |

FOREIGN PATENTS

| 453,124 | France | Mar. 28, 1913 |
| 303,150 | Germany | Jan. 24, 1918 |
| 313,322 | Germany | July 8, 1919 |
| 577,025 | Great Britain | May 1, 1946 |
| 64,018 | Sweden | May 4, 1925 |